US012724979B1

(12) United States Patent
Bialer et al.

(10) Patent No.: US 12,724,979 B1
(45) Date of Patent: Sep. 1, 2026

(54) CLOSED-LOOP SPECULATIVE DECODING WITH REAL-TIME PROMPT PATCHING FOR LANGUAGE MODEL OUTPUT GENERATION

(71) Applicant: Intuit Inc., Mountain View, CA (US)

(72) Inventors: Amir Bialer, Petah Tikva (IL); Shai Ardazi, Petah Tikva (IL); Shon Mendelson, Tel Aviv (IL); Binyamin Ariel, Petah Tikva (IL)

(73) Assignee: Intuit Inc., Mountain View, CA (US)

(*) Notice: Subject to any disclaimer, the term of this patent is extended or adjusted under 35 U.S.C. 154(b) by 0 days.

(21) Appl. No.: 19/543,836

(22) Filed: Feb. 18, 2026

(51) Int. Cl.
*G06F 40/30* (2020.01)
*G06F 18/22* (2023.01)
*G06F 40/284* (2020.01)

(52) U.S. Cl.
CPC .............. *G06F 40/30* (2020.01); *G06F 18/22* (2023.01); *G06F 40/284* (2020.01)

(58) Field of Classification Search
CPC ........ G06F 40/30; G06F 40/284; G06F 40/35; G06F 40/216; G06F 40/211; G06F 40/253; G06F 40/279; G06F 40/20; G06F 40/205; G06F 40/295; G06F 18/22; G06F 16/35; G06F 16/3329; G06F 16/353; G06F 16/215; G06F 16/285; G06F 16/345; G06F 17/2785; G06F 11/3684; G10L 15/22; G10L 15/1815; G06N 20/00; G06N 3/0475; G06N 3/08
USPC .......................................................... 704/1-9
See application file for complete search history.

(56) References Cited

U.S. PATENT DOCUMENTS

2009/0119095 A1* 5/2009 Beggelman ............. G06F 40/30 704/9
2015/0142811 A1* 5/2015 Henry ................... G06F 16/285 707/738
2016/0155067 A1* 6/2016 Dubnov .................. G06F 40/30 706/12

(Continued)

FOREIGN PATENT DOCUMENTS

CN 119047579 A * 11/2024 ........... G06F 40/232
WO WO-2024118603 A1 * 6/2024 ............. G06F 16/35

OTHER PUBLICATIONS

Lee et al. "SCI-FII: Speculative Conversational Interface Framework for Incremental Inference on Modularized Services", IEEE 18th International Conference on Mobile Data Management, p. 280-285, (Year: 2017).*

(Continued)

*Primary Examiner* — Leshui Zhang
(74) *Attorney, Agent, or Firm* — Lathrop GPM LLP

(57) ABSTRACT

A method includes generating, by a draft model, a token sequence in response to an input prompt. The method further includes performing concurrent operations of classifying, by a verifier model, a characteristic of the token sequence to obtain a classification type of the token sequence and verifying that a semantic accuracy of the token sequence satisfies an accuracy threshold. The method further includes regenerating at least a portion of the token sequence responsive to at least one of the classification type of the token sequence being in a negative category, and the token sequence failing to satisfy the accuracy threshold. The method further includes adding the token sequence to an output sequence and transmitting the output sequence.

20 Claims, 5 Drawing Sheets

(56) References Cited

U.S. PATENT DOCUMENTS

| | | | | |
|---|---|---|---|---|
| 2019/0108257 | A1* | 4/2019 | Lefebure | G06F 40/211 |
| 2020/0134058 | A1* | 4/2020 | Liu | G06F 16/2379 |
| 2020/0265076 | A1* | 8/2020 | Kershaw | G06F 16/353 |
| 2021/0056263 | A1* | 2/2021 | Xia | G06F 40/268 |
| 2022/0245354 | A1* | 8/2022 | Mackay | G06F 40/30 |
| 2025/0363347 | A1* | 11/2025 | Galvin | G06N 3/045 |
| 2025/0378385 | A1* | 12/2025 | Koh | G06F 30/27 |
| 2026/0017347 | A1* | 1/2026 | Fortkort | G06F 18/25 |

OTHER PUBLICATIONS

Leviathan, Y., et al., "Fast Inference from Transformers via Speculative Decoding", May 18, 2023, 13 pages.
Zhang, J., et al., "Draft & Verify: Lossless Large Language Model Acceleration via Self-Speculative Decoding", Aug. 11-16, 2024, 20 pages.

* cited by examiner

CLOSED-LOOP SPECULATIVE DECODING WITH REAL-TIME PROMPT PATCHING FOR LANGUAGE MODEL OUTPUT GENERATION

BACKGROUND

Large language models (LLMs) may be deployed in interactive applications of regulated or brand-sensitive domains, such as tax-preparation assistants, financial guidance tools, compliance-sensitive chatbots, and other enterprise-grade conversational systems. The responses should be factually accurate, tone-appropriate, and compliant with legal and policy considerations, even under rapid user interaction. Users expect sub-second latency. Moreover, in certain uses, the generated message should adhere to institutional tone, avoid confrontational or unprofessional phrasing, include disclaimers, and comply with domain-specific rules. As a result, enterprises may face a risk that fast LLM responses may fail to meet stringent trust, safety, and regulatory expectations, while highly constrained or manually curated responses degrade responsiveness and user experience.

LLM acceleration methods are designed to improve inference speed, but may not evaluate tone, policy compliance, brand-appropriateness, or the presence or absence of legal disclaimers. Further, LLMs may not detect when a conversation drifts, during inference, towards tone or policy non-compliance. Thus, a challenge arises in detecting drift in sentiment tone and missing compliance-qualifying language during token-by-token generation of LLM accelerated methods. A further challenge arises in regulated enterprise contexts where it is desirable to concurrently satisfy both low latency and accuracy standards or measures.

SUMMARY

In general, in one aspect, one or more embodiments relate to a method. The method includes generating, by a draft model, a token sequence in response to an input prompt. The method further includes performing concurrent operations of classifying, by a verifier model, a characteristic of the token sequence to obtain a classification type of the token sequence and verifying that a semantic accuracy of the token sequence satisfies an accuracy threshold. The method further includes regenerating at least a portion of the token sequence responsive to at least one of the classification type of the token sequence being in a negative category, and the token sequence failing to satisfy the accuracy threshold. The method further includes adding the token sequence to an output sequence and transmitting the output sequence.

In general, in one aspect, one or more embodiments relate to a system. The system includes at least one computer processor, and a draft model, executing on the at least one computer processor. The system further includes a verifier model, executing on the at least one computer processor. The system further includes an inference orchestrator, executing on the at least one computer processor, and configured to cause the draft model to generate a token sequence in response to an input prompt. The inference orchestrator is further configured to perform concurrent operations of invoking the verifier model to classify a characteristic of the token sequence to obtain a classification type of the token sequence and verifying that a semantic accuracy of the token sequence satisfies an accuracy threshold. Responsive to at least one of the classification type of the token sequence falling into a negative category and the token sequence failing to satisfy the accuracy threshold, the inference orchestrator is further configured to cause the draft model to regenerate at least a portion of the token sequence. The inference orchestrator is further configured to add the token sequence to an output sequence and transmit the output sequence.

In general, in one aspect, one or more embodiments relate to a method. The method includes receiving, by an inference orchestrator, an input prompt from a user application. The method further includes generating, by a draft model, a first token sequence as a first partial response to the input prompt. The method further includes performing concurrent operations of classifying, by a verifier model, a characteristic of the first token sequence to obtain a classification type of the first token sequence and verifying, by the inference orchestrator, that a semantic accuracy of the first token sequence satisfies an accuracy threshold. Responsive to the classification type indicating a negative sentiment tone, the method further includes augmenting a context of the input prompt, with a first instruction to correct the negative sentiment tone. Responsive to the classification type indicating a detection of an absence of compliance-qualifying language, the method further includes augmenting the context of the input prompt with a second instruction to generate the compliance-qualifying language and regenerating, by the draft model according to at least one of the first instruction and the second instruction, a portion of the first token sequence to obtain a modified token sequence having at least one of a corrected sentiment tone and the compliance-qualifying language. The method further includes assigning the modified token sequence as a third token sequence. Responsive to the semantic accuracy of a second token sequence failing to satisfy the accuracy threshold, the method further includes generating, by a target model, the third token sequence as a second partial response to the input prompt. The method further includes adding the third token sequence to an output sequence and transmitting the output sequence.

Other aspects of one or more embodiments will be apparent from the following description and the appended claims.

BRIEF DESCRIPTION OF DRAWINGS

Like elements in the various figures are denoted by like reference numerals for consistency.

DETAILED DESCRIPTION

One or more embodiments are directed to a machine learning system that implements a speculative decoding framework with dual verification of speculative output and real-time prompt patching to improve response tone, policy compliance, and factual accuracy. In the speculative decoding approach, a draft model rapidly produces a speculative token sequence, before a larger, target language model evaluates the token sequence. One or more embodiments introduce a verification workflow that concurrently evaluates characteristics of the speculative sequence, such as tone or compliance, as well as its semantic accuracy.

In one or more embodiments, a draft model generates a token sequence in response to an input prompt, such as a user question. The machine learning system then performs two concurrent operations. A verifier model classifies a semantic characteristic of that token sequence and determines whether the classification falls into a positive or negative category. Concurrently, a target model verifies whether the semantic accuracy of the sequence satisfies a predetermined accuracy threshold. The draft model is a relatively smaller language model, trained on around a billion parameters, than the target model, which may have hundreds of billions, or trillions, of parameters. The parallel evaluations facilitate the machine learning system to detect, during inference, a negative classification type (e.g., confrontational tone or missing compliance-qualifying language) and/or a semantic accuracy failure. When at least one of those conditions occurs, the system regenerates at least a portion of the token sequence, ensuring that unsuitable token sequences are not carried forward.

Once the token sequence meets both the characteristic-based and accuracy-based criteria, the token sequence is accepted, and added to an output sequence. When generation is complete, the system transmits the output sequence as a fully verified segment of model-generated text. In this way, the one or more embodiments transform speculative generation into a closed-loop, monitored process, so that the accepted token sequence is simultaneously rapid and semantically aligned with tone and compliance expectations.

Figure 1:
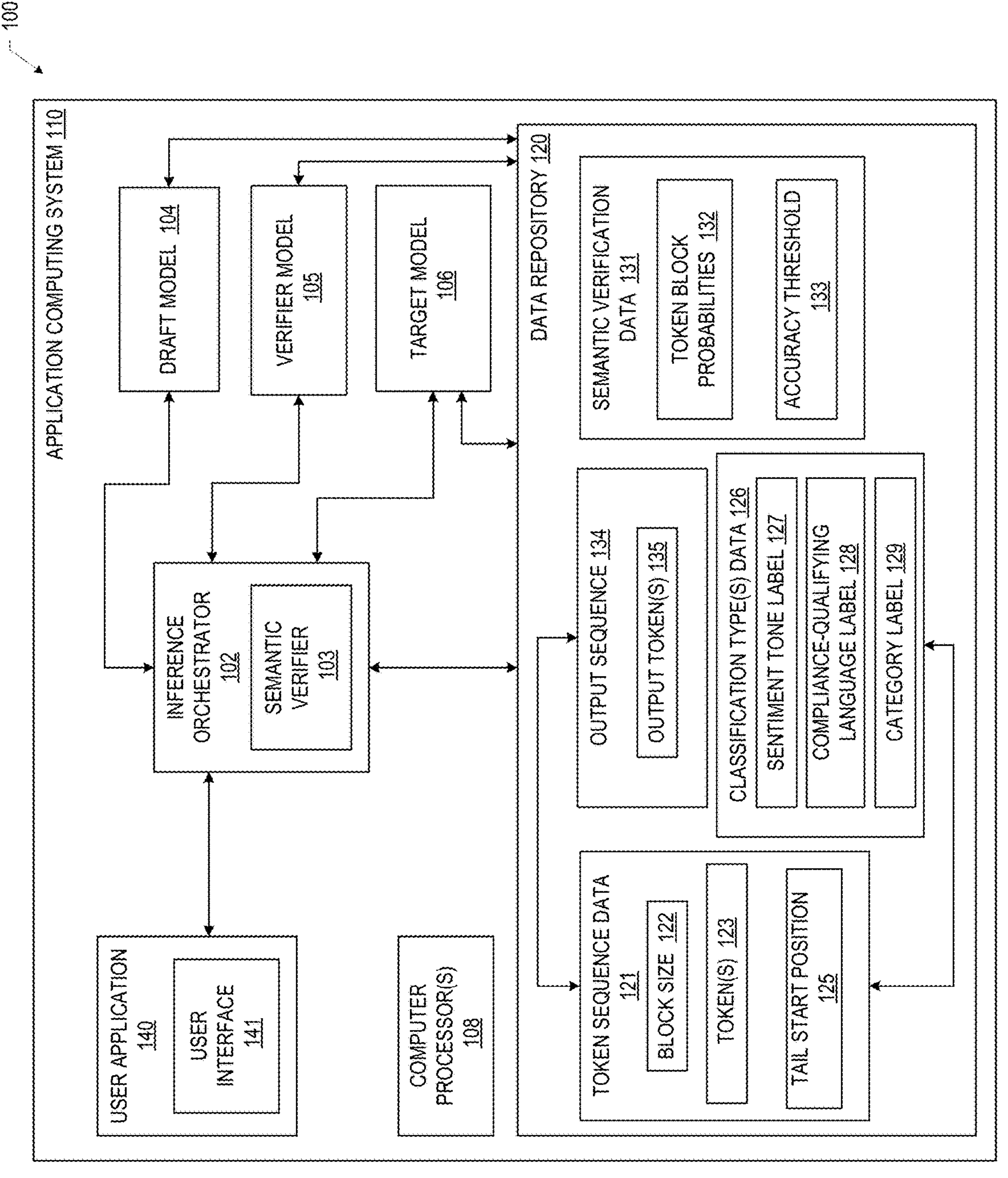
FIG. 1 shows a computing system, in accordance with one or more embodiments.

Attention is now turned to the figures. FIG. 1 shows a computing system (100), in accordance with one or more embodiments. The system shown in FIG. 1 may include an application computing system (110). The application computing system (110) is one or more computer processors, data repositories, communication devices, and supporting hardware and software. The application computing system (110) may be in a distributed computing environment. The application computing system (110) includes at least one computer processor(s) (108). The computer processor(s) (108) is one or more hardware or virtual processors which may execute computer readable program code that defines one or more applications, such as the inference orchestrator (102), the draft model (104), the verifier model (105), the target model (106), or the user application (140). An example of the computer processor is described with respect to the computer processor(s) (502) of FIG. 5A. Thus, the application computing system (110) is configured to execute one or more applications, such as the inference orchestrator (102), the draft model (104), the verifier model (105), the target model (106), or the user application (140). An example of a computer system and network that may form the application computing system (110) is described with respect to FIG. 5A and FIG. 5B.

The application computing system (110) includes a data repository (120). The data repository (120) is a type of storage unit or device (e.g., a file system, database, data structure, or any other storage mechanism) for storing data. The data repository (120) may include multiple different, potentially heterogeneous, storage units and/or physical storage devices.

The data repository (120) includes token sequence data (121). The token sequence data (121) is a structured data representation of a sequence of tokens generated in the speculative decoding framework. The token sequence data (121) may further include the block size (122) of the sequence of tokens, which indicates the number of tokens generated by the draft model during a single speculative decoding iteration. The block size (122) defines the token sequence boundaries within the closed-loop speculative decoding process. In one or more embodiments, the block size (122) may be a predefined block size, configurable by the inference orchestrator (102). For example, the block size (122) may be set at around 6-12 words, or phrases. In another example, the block size (122) may be set as around 150-200 tokens. Other block sizes may be possible. The token sequence data (121) further includes the token sequence (123), which is the actual sequence of tokens generated by the draft model prior to evaluation by the verifier model and the target model. The token sequence (123) is the draft model's speculative output in response to an input prompt.

The token sequence data (121) may further include a tail start position (125). The tail start position (125) is a data element identifying the beginning of the semantic unit within the token sequence (123) that is designated for partial regeneration by the draft model. In one embodiment, the tail start position (125) may correspond to the earliest semantic unit (e.g., clause or sentence) that has a characteristic that may be classified as a negative category. The characteristic may refer to the semantic tone of the token sequence (123), or the presence/absence of compliance-qualifying language in the token sequence (123). In one or more embodiments, the tail start position (125) may be determined by segmenting the token sequence (123) into semantic units (e.g., clauses or sentences). The semantic units may be classified by the verifier model. Further, the beginning of a first semantic unit whose classification falls into a negative category, in the token sequence (123) may be identified as the tail start position (125).

The data repository (120) further includes output sequence (134). The output sequence data (134) stores the output token sequence that is produced after successful verification and conditional regeneration steps have been applied to the token sequence (123). The output sequence data (134) is the ordered aggregation of token sequences (123), accumulated through the iterative, closed-loop speculative decoding process. Accepted token sequence (123) are appended to the output token(s) (135) to form the output sequence (134). The output sequence token(s) (135) represent the vetted, trust-aligned, and semantically accurate output of the speculative decoding framework.

The data repository (120) further includes one or more classification type(s) data (126). The classification type data (126) captures the results of the verifier model (105)'s trust-alignment evaluation of the token sequence (123).

A characteristic of the token sequence refers to a semantic characteristic, meaning a feature of the generated text that relates to the meaning, intent, communicative framing, or policy-aligned presentation of the content represented by the token sequence. A semantic characteristic may include aspects of how the text communicates information, other than what factual content the text conveys. Semantic characteristics may be assessed using classification models, sentiment analysis, embedding-based similarity techniques, or other natural-language understanding models that operate on text segments such as phrases, clauses, or sentences. Thus, the token sequence may be segmented into semantic units of phrases, clauses, or sentences for semantic characteristic analysis, for sentiment tone and the presence/absence of compliance-qualifying language.

In the context of the closed-loop speculative decoding system, a semantic characteristic may correspond to trust-alignment features, such as maintaining an appropriate tone of conversation, or including disclaimers or qualifiers associated with regulated communication domains. These characteristics may inform whether the system regenerates a portion of the token sequence or proceeds with semantic verification by the target model.

Sentiment tone is a semantic characteristic representing the communicative attitude, affect, or interpersonal stance expressed by the token sequence. Sentiment tone reflects the stylistic and interpersonal qualities of the generated language, such as professionalism, politeness, respectfulness, neutrality, empathy, or confrontational or sarcastic tendencies.

In some embodiments, the verifier model (105) may evaluate sentiment tone by assigning the token sequence to classification labels such as professional, respectful, neutral, dismissive, condescending, sarcastic, intimidating, or confrontational. The classification labels may fall broadly into positive and negative categories. Classification labels of sentiment tones falling in the negative category may correspond to classifications inconsistent with the communication policies of the system, e.g., sarcasm, derision, or abrupt phrasing. On the other hand, positive category classification labels of sentiment tones may correspond to classification labels such as "professional" and "respectful." When the sentiment tone of a semantic unit of the token sequence falls into the negative category, the input prompt may be modified, or "patched" to direct the draft model to regenerate the portion of the token sequence beginning at the earliest semantic unit exhibiting the negative sentiment tone.

Compliance-qualifying language is another semantic characteristic, indicating whether a token sequence includes regulatory, cautionary, or policy qualifiers associated with the substantive content of an answer. Compliance-qualifying language may include textual statements that communicate conditionality, regulatory constraints, legal boundaries, or professional advice disclaimers associated with the user's query. Compliance-qualifying language may include text fragments such as: "depending on applicable guidelines," "consult a qualified professional," "subject to current regulatory requirements," "varies based on individual circumstances," or "verify with official documentation." Compliance-qualifying language may be desired when providing information that could otherwise be interpreted as legal, tax, or financial advice. The absence of compliance-qualifying language may trigger a negative category classification in the verifier model, resulting in a prompt patch instructing the draft model to regenerate the defective semantic unit such that the corrected token sequence includes the qualifiers.

Accordingly, the classification type(s) data (126) may include one or more verifier model (105) outputs indicating whether the token sequence (123) satisfies predetermined trust-alignment characteristics. The classification type data (126) further includes sentiment tone labels (127), representing a classification of the emotional or professional tone expressed within the token sequence (123). The sentiment tone labels (127) may include diverse sentiment-tone classification labels such as "professional," "respectful," "neutral," "confrontational," or "dismissive." The sentiment tone labels may further be categorized as "positive" (e.g., "professional," "respectful," "neutral") or "negative" (e.g., "confrontational," "dismissive").

The classification type data (126) further includes labels indicating the presence of compliance-qualifying language (128) in the token sequence (123). Compliance-qualifying language label (128) may indicate whether the token sequence (123) contains disclaimers, caveats, or regulatory-driven qualifiers. For example, indications that tax-related outcomes depend on regulation guidelines or require consultation with a qualified professional are some caveats/regulatory-driven qualifiers. The compliance-qualifying language label (128) may be "absent" or "present", to indicate the absence/presence of compliance-qualifying language in the token sequence (123). The classification type (126) may further include a category label (129), which identifies whether the sentiment tone label (127) and/or the compliance-qualifying language label (128) classification falls into a positive category, or a negative category, (e.g., "positive" or "negative") Thus, the classification types (126) collectively determine whether the draft model will regenerate a portion of the token sequence beginning at the tail start position (125).

The data repository (120) further includes semantic verification data (131). The semantic verification data (131) includes information generated by the draft model (104) and the target model (106). The semantic verification data (131) may be used for semantic-accuracy verification performed by the semantic verifier (103). The semantic verification data (131) may include token block probabilities (132). The token block probabilities (132) represent the probability distributions generated by the target model (106), and the draft model (104) over the vocabulary space when evaluating the correctness of tokens in the token sequence (123). The probability distributions from the individual models are compared during semantic verification to determine whether the token sequence (123) satisfies the accuracy threshold. The semantic verification data (131) further includes an accuracy threshold (133). The accuracy threshold (133) defines the allowable degree of divergence between the draft model's token-level probabilities and the target model's corresponding probabilities.

A measure of difference between the draft model's and the target model's token block probabilities (132) may exceed the accuracy threshold (133) at a position in the token sequence (123). When the measure of difference exceeds the accuracy threshold, the entire token sequence (123) may be designated as semantically inaccurate. In such cases, the closed-loop speculative decoding system invokes the target model directly to regenerate the entire token sequence (123) in one or more embodiments. The semantic verification data (131) therefore is used so that output token(s) (135) conform to a semantic accuracy standard defined by the target model. Thereby, factual misalignment or inappropriate semantic drift in the final output sequence may be prevented.

The system components of the application computing system (110) include the inference orchestrator (102), draft model (104), verifier model (105), and target model (106). The system components contribute to the generation, verification, and correction of a token sequence within a speculative decoding framework. The system components together form a machine-learning inference pipeline that implements a closed-loop speculative decoding process with integrated trust-characteristic verification. The inference orchestrator (102) coordinates the iterative generation and evaluation of speculative token sequences produced by the draft model (104), the trust-alignment verification performed by the verifier model (105), and the semantic verification performed by the target model (106). As a result, the system forms a feedback loop in which token sequences are classified, evaluated, and conditionally regenerated until the final output sequence satisfies both trust-alignment and semantic-accuracy criteria.

The speculative decoding framework operates by generating a multi-token sequence using the draft model (104). Further, the verifier model (105) classifies characteristics of sentiment tone and compliance-qualifying language of the token sequence. Furthermore, the semantic accuracy of the token sequence is verified using the target model (106). When verification results indicate a trust-alignment failure, the draft model (104) regenerates a portion of the token sequence beginning at a tail start position. On the other hand, a semantic-accuracy failure may trigger the target model (106) to regenerate the entire token sequence, without involvement from the draft model (104). The inference orchestrator (102) manages the interactions of the models in real time. As a result, an output sequence is produced that is trust-aligned and semantically accurate.

The inference orchestrator (102) is software or application-specific hardware, which, when executed on the one or more computer processors (108), coordinates and orchestrates the operation of the closed-loop speculative decoding process. In one or more embodiments, the inference orchestrator (102) may invoke the draft model (104) to produce a speculative token sequence. Further, the inference orchestrator (102) may coordinate concurrent verification operations by routing the token sequence to the verifier model (105) and to the target model (106). The inference orchestrator (102) may further evaluate the verification results to determine whether the token sequence should be accepted, partially regenerated, or fully regenerated. Thus, the inference orchestrator (102) may perform the sequencing logic that drives the iterative structure of the speculative decoding loop. Thus, the iterations are designed to yield an output sequence consistent with both trust-alignment characteristics and semantic-accuracy.

The inference orchestrator (102) may additionally communicate regeneration directives to the models. When the verifier model (105) identifies a negative classification category for the token sequence, the inference orchestrator (102) may modify the active prompt with a "patch" instructing the draft model to correct the token sequence. When the semantic verifier (103) determines that the token sequence fails to satisfy the semantic-accuracy threshold, the inference orchestrator (102) may direct the target model (106) to regenerate the entire token sequence. Thus, the inference orchestrator (102) maintains the integrity of the closed-loop generation-verification regeneration process.

The inference orchestrator further includes a semantic verifier (103). The semantic verifier (103) evaluates the semantic accuracy of a token sequence by comparing the draft model's token-level probability distributions of the speculative token sequence with the target model's corresponding token-level probability distributions of the speculative token sequence. In one or more embodiments, the semantic verifier (103) may receive the speculative token sequence and its associated probability distributions and compare them to the target model's expected output at inference time. When the divergence between the distributions exceeds an accuracy threshold, the semantic verifier (103) may flag the token sequence as semantically inaccurate.

The verifier model (105) is configured to perform trust-alignment verification of a token sequence generated during speculative decoding. The verifier model (105) may evaluate at least one semantic characteristic of the token sequence, such as sentiment tone or the presence of compliance-qualifying language and produce a classification type for the characteristic. Notably, the verifier model (105) is distinct from the draft and target models in that it is not a language model and does not perform generative token prediction. In one or more embodiments, the verifier model (105) may perform discriminative classification, similarity scoring, or other non-generative semantic evaluation. The verifier model (105) thus may operate efficiently and with low latency during inference.

In one embodiment, the verifier model (105) may be a supervised multi-class sentiment classifier, trained to assign sentiment tone labels to a semantic unit, such as a clause or sentence, derived from the token sequence. The verifier model (105) may be trained using a labeled dataset containing examples of sentences paired with sentiment labels, such as professional, respectful, neutral, confrontational, sarcastic, or dismissive. The classifier may extract features using word embeddings, recurrent neural layers, convolutional layers, or other machine learning artifacts and architectures. In one embodiment, the verifier model (105) may include a fully connected prediction head that outputs a probability distribution over the sentiment categories. During inference, the token sequence may be segmented into semantic units. The semantic units may be encoded using the classifier's input representation, and the classifier outputs sentiment tone labels for the semantic units. A location or index in the token sequence of a semantic unit whose classification falls into a negative category may be identified as the tail start position for partial regeneration by the draft model (104).

In another embodiment, the verifier model (105) may be an embedding-based similarity model, configured to detect the presence or absence of compliance-qualifying language within a token sequence. The verifier model (105) may compute an embedding vector for a semantic unit and compare the embedding vector to one or more reference embeddings representing prototypical compliance language, such as regulatory disclaimers, cautionary qualifiers, or policy caveats. Example embeddings may represent phrases such as "depending on IRS guidelines," "consult a qualified professional," or "subject to regulatory requirements." The verifier model (105) may compute a similarity score, such as cosine similarity, between the semantic-unit embedding and the various reference embeddings. If the similarity score falls below a threshold, the model may classify the semantic unit as lacking compliance-qualifying language.

In some embodiments, the verifier model (105) may be a joint classifier trained to output both sentiment-tone and compliance-qualifying classifications for a semantic unit. The classifier may include shared embeddings or transformer layers that encode the semantic unit, followed by multiple prediction heads. A first prediction head may be trained to output a sentiment-tone label. A second prediction head may be trained to output a binary or multi-class compliance category. The classifier may be trained on a hybrid dataset having both emotional-tone annotations and compliance-related labels extracted from policy-aligned corpora. During inference, a semantic unit may be classified simultaneously for both characteristics. A classification type for either characteristic that has a negative connotation may result in assigning the classification to the negative category, initiating corrective regeneration. As a result, the machine learning system simplifies inference processing by consolidating tone and compliance scoring into a single verifier model.

Across diverse embodiments, the verifier model (105) may be configured to receives a speculative token sequence and segments the token sequence into semantic units (sentence, clause, fixed window). The verifier model (105) may further determine classification types (tone category, compliance-qualifying presence/absence, or both) and assign the classification types to the corresponding semantic units. The verifier model (105) may further identify the earliest semantic unit whose classification type falls into the negative category and return the semantic unit to the inference orchestrator (102). The inference orchestrator (102) may further identify the tail start position (125) from the semantic unit.

The application computing system (110) further includes a draft model (104). The draft model (104) is a relatively smaller language model configured to generate speculative token sequences in response to an input prompt. The draft model (104) produces a multi-token sequence that serves as a candidate continuation within the speculative decoding framework. As a result, the draft model (104) increases inference throughput by generating tokens more rapidly than the target model (106), thereby supplying candidate token sequences for evaluation in the closed-loop decoding process.

The draft model (104) may further perform partial regeneration of a token sequence when directed by the inference orchestrator (102). In the event that the verifier model (105) identifies a classification type of a negative category, the inference orchestrator (102) may issue a prompt modification. The inference orchestrator (102) may further direct the draft model (104) to regenerate a portion of the token sequence beginning at the tail start position determined using semantic-unit segmentation. As a result, the draft model (104) may correct tone and compliance issues without discarding the entire speculative token sequence, thereby preserving generation efficiency.

The application computing system (110) further includes a target model (106). The target model (106) is a large language model (LLM), for example, GEMINI® model, LLAMA® model, or CHATGPT® model. The target model is configured to perform semantic verification and token sequence regeneration in the speculative decoding system. The target model (106) may generate token-level probability distributions corresponding to the current speculative token sequence and produce an alternative token sequence when semantic accuracy fails. The target model (106) serves as the reference model for semantic fidelity, ensuring that accepted token sequences adhere to a high standard of correctness and contextual coherence. When the semantic verifier (103) or the inference orchestrator (102) determines that the token sequence (123) does not satisfy the semantic-accuracy threshold, the token sequence (123) may be discarded. The target model (106) may then generate a replacement token sequence without using speculative techniques, which replaces the token sequence (123).

The application computing system (110) further includes a user application (140), having a user interface (141). In one or more embodiments, the user application (140) may be a web-based client application, operating within a web browser. Other embodiments of the user application (140) may include native desktop applications, mobile applications, remote desktop clients, etc. The user application (140) may be serviced by one or more applications executing on the application computing system (110). For example, the application may be an office productivity-based application (e.g., OFFICE 365® application), a graphics-based application, a financial application (e.g., QUICKBOOKS® application), a multi-media application, or other type of application. In one or more embodiments, a user may enter a prompt using the user interface (141) of the user application (140). The prompt may be received by the inference orchestrator (102) acting as a gateway to the speculative decoding framework.

While FIG. 1 shows a configuration of components, other configurations may be used without departing from the scope of one or more embodiments. For example, various components may be combined to create a single component. As another example, the functionality performed by a single component may be performed by two or more components.

Figure 2:
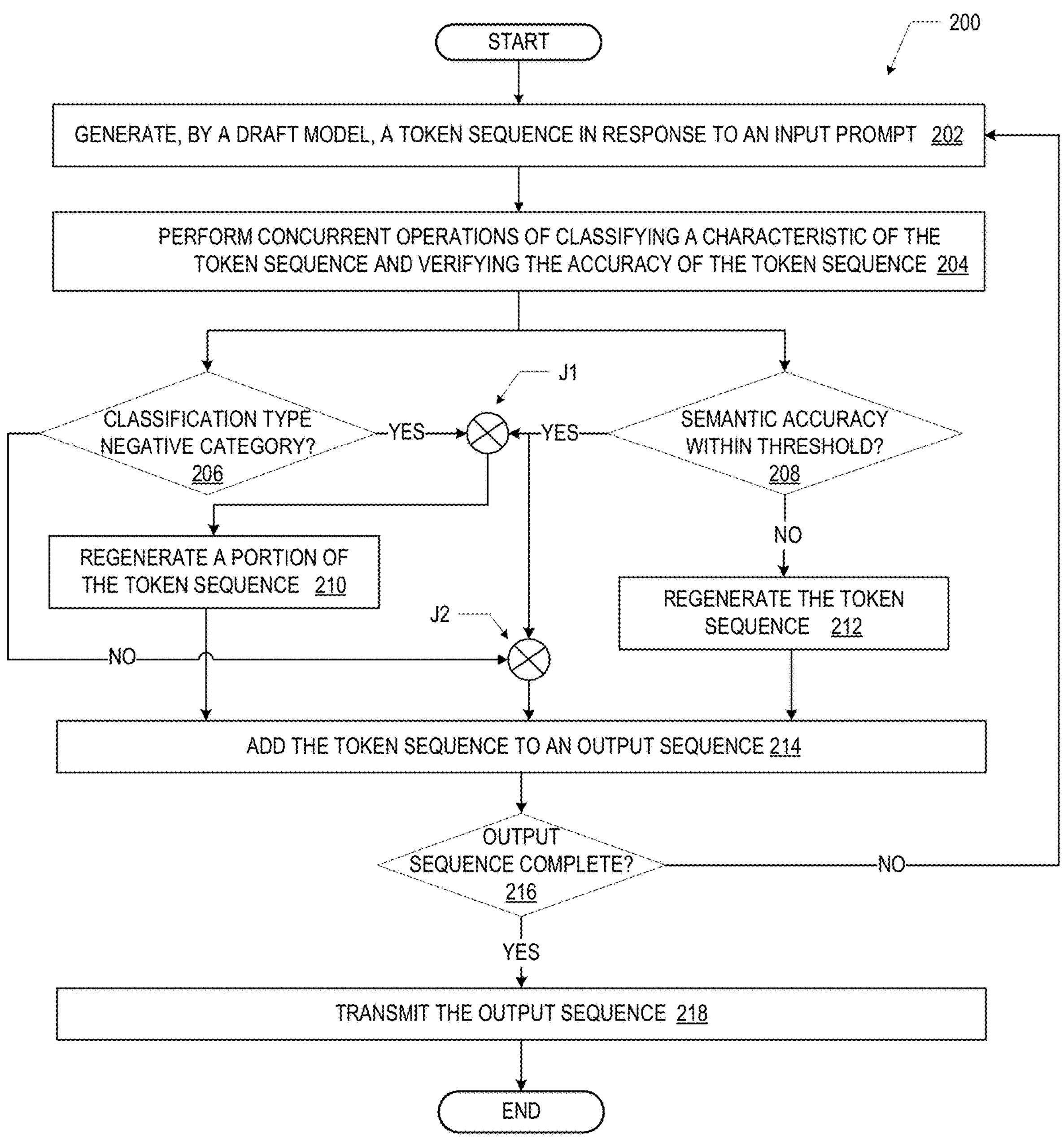
FIG. 2 shows a flowchart of a method, in accordance with one or more embodiments.

FIG. 2 shows a flowchart 200 of a method for closed-loop speculative decoding, in accordance with one or more embodiments. The method of FIG. 2 may be implemented using the system of FIG. 1 and one or more of the steps may be performed on or received at one or more computer processors. While the various steps in the flowchart 200 are presented and described sequentially, at least some of the steps may be executed in different orders, may be combined, or omitted, and at least some of the steps may be executed in parallel. Furthermore, the steps may be performed actively or passively.

In Block 202, a token sequence is generated by a draft model in response to an input prompt. In one or more embodiments, the draft model may generate a speculative token sequence of a predetermined block size, and the speculative token sequence may include the token sequence. The speculative token sequence may constitute a partial response to the input prompt. The token sequence may be appended to, or may constitute, a portion of a longer output sequence under construction.

In Block 204, concurrent operations of classifying a characteristic of the token sequence and verifying the accuracy of the token sequence may be performed. In one or more embodiments, the concurrent operations may include classifying, by a verifier model, a characteristic of the token sequence to obtain a classification type; and verifying, by a target model, that a semantic accuracy of the token sequence satisfies an accuracy threshold. The classification type may include sentiment tone and/or presence of compliance-qualifying language and may be categorized as positive or negative. The semantic accuracy verification may include comparing a first token probability distribution produced by the draft model to a second token probability distribution produced by the target model and determining whether a measure of difference satisfies the accuracy threshold. In one or more embodiments, responsive to a measure of difference between the first token probability distribution and the second token probability distribution failing to satisfy the accuracy threshold, the token sequence may be rejected.

In Block 206, a determination may be made whether the classification type falls into a negative category. In one or more embodiments, the negative category may include a negative sentiment tone and/or a detection of an absence of compliance-qualifying language as indicated by the verifier model. If the classification type falls into a negative category, control may pass to junction J1. If the classification type does not fall into a negative category, control may pass to junction J2.

In one or more embodiments, the junction node J2, following Blocks 206 and 208 may enforce that specific conditions determined in both Blocks 206 and 208 should be satisfied. Namely, the classification type does not fall into a negative category, and the semantic accuracy satisfies the accuracy threshold for control to pass to Block 214. In a similar manner, junction node J1 may enforce that other specific conditions determined in both Blocks 206 and 208 should be satisfied for control to pass to Block 210. In this case, the conditions are that the classification type does, in fact, fall into a negative category and the semantic accuracy satisfies the accuracy threshold.

Accordingly, in Block 208, a concurrent determination may be made whether the semantic accuracy of the token sequence lies within the accuracy threshold. In one or more embodiments, the determination may be based on a difference measure between the draft-model distribution and the target-model distribution for the token sequence. If the accuracy does not satisfy the accuracy threshold, control passes to Block 212. If the accuracy satisfies the threshold, control may pass to junctions J1 and J2. Thus, junctions J1 and J2 act as logical gateways conditioned jointly on specific results from Blocks 206 and 208.

Thus, responsive to at least one of the classification type of the token sequence falling into a negative category, and the token sequence failing to satisfy the accuracy threshold, in one or more embodiments, the inference orchestrator may be configured to cause the draft model to regenerate at least a portion of the token sequence.

In Block 210, a portion of the token sequence is regenerated. In one or more embodiments, responsive to the classification type falling into a negative category, a context of the input prompt may be augmented with an instruction to correct the detected issue, and the draft model may regenerate the portion to obtain a modified token sequence. When the negative category indicates a negative sentiment tone, the augmentation may include an instruction to produce a corrected sentiment tone. When the negative category indicates an absence of compliance-qualifying language, the augmentation may include an instruction to generate compliance-qualifying language within the regenerated portion.

In Block 212, the token sequence may be regenerated. In one or more embodiments, responsive to the token sequence failing to satisfy the accuracy threshold, the entire token sequence may be regenerated. In some embodiments, the target model may generate a second token sequence, and the second token sequence may be assigned as the token sequence for subsequent evaluation and potential acceptance. In further embodiments, responsive to both the semantic characteristic of the token sequence falling into the negative category and the semantic accuracy failing to satisfy the threshold, the token sequence generated by the draft model may be discarded. The target model may then regenerate a second token sequence as the token sequence.

In Block 214, the token sequence may be added to an output sequence. In one or more embodiments, the addition may occur when both conditions discussed in the junction logic may be satisfied: namely, the classification type may fall into a positive category and the semantic accuracy may satisfy the accuracy threshold. The positive category may include an appropriate or positive sentiment tone and a detection of compliance-qualifying language. The output sequence may be maintained as an evolving buffer of accepted tokens or token sequences.

In Block 216, a determination is made as to whether the output sequence is complete. In one or more embodiments, completion may be based on reaching a requested length, producing a termination token, satisfying an application-specific stop criterion, or detecting a user-defined end-of-sequence condition. If the output sequence is not complete, control may return to Block 202 for further speculative decoding and concurrent verification; otherwise, control may pass to Block 218.

In Block 218, the output sequence may be transmitted. In one or more embodiments, the transmission may be directed to a user interface, an application endpoint, a downstream service, or a storage destination. The transmitted output sequence may include the previously accepted token sequences, which may have satisfied both the classification and the semantic accuracy criteria prior to acceptance.

Figure 3:
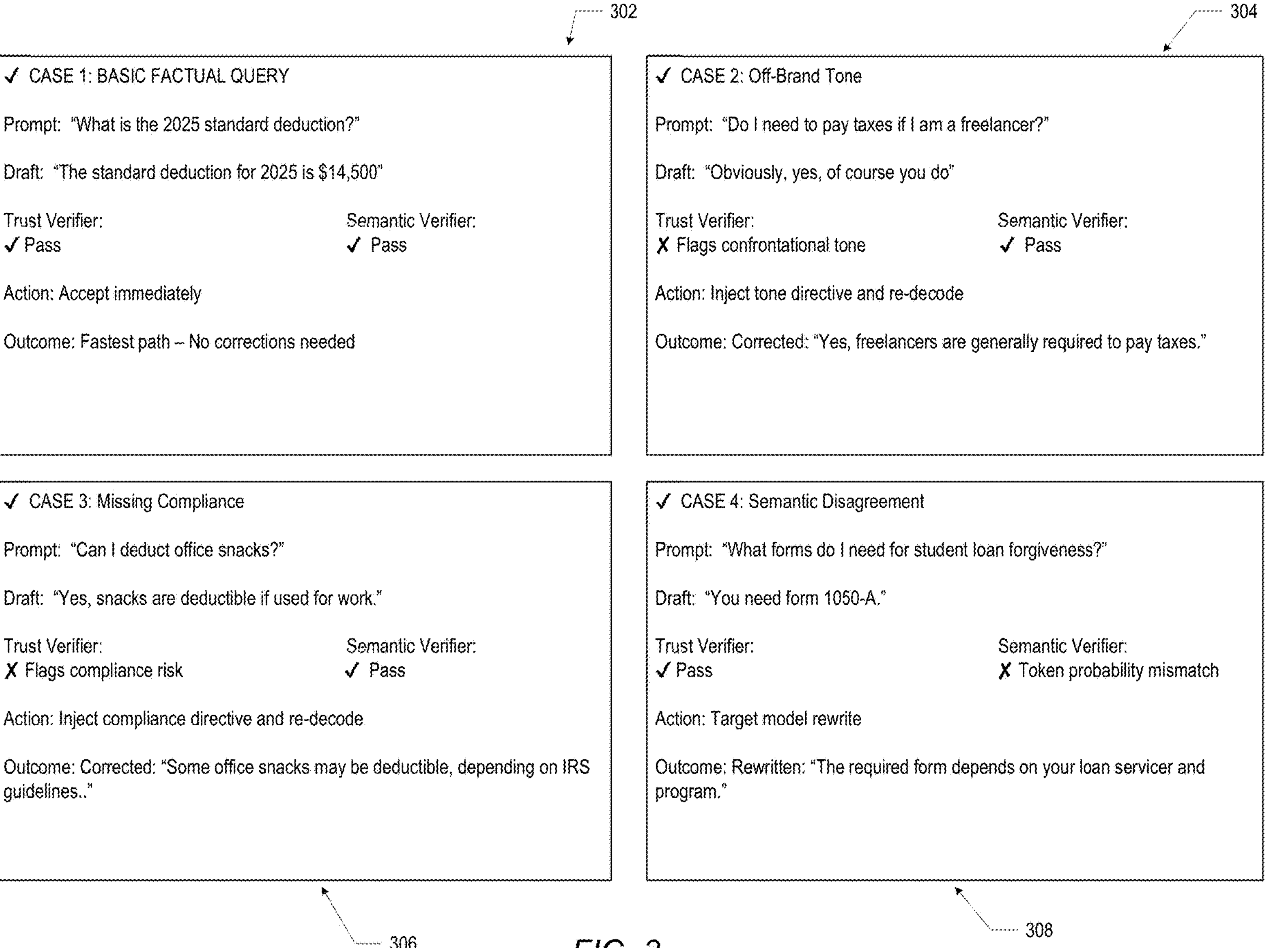
FIGS. 3 and 4 show examples, in accordance with one or more embodiments.

FIG. 3 shows an example of prompts and responses corrected in real time by the machine learning system implementing the closed-loop speculative decoding framework, in accordance with one or more embodiments. The following example is for explanatory purposes only and not intended to limit the scope of one or more embodiments.

Block 302 shows a case involving a basic factual query. In Block 302, a basic factual prompt may be processed without requiring any corrections. In one or more embodiments, the draft model may generate a speculative token sequence in response to the user prompt "What is the 2025 standard deduction". The draft model output may be evaluated concurrently by a verifier model for classification type and by a target model for semantic accuracy. The classification type may fall into a positive category, such as neutral or professional tone and the presence of compliance-qualifying language. Further, the semantic accuracy may satisfy an accuracy threshold determined by comparing token probability distributions of the draft model and the target model. Since both conditions are satisfied, the token sequence may be accepted immediately and added to the output sequence without regeneration. Thus, the case of Block 302 may illustrate a "happy-path" condition.

Block 304 shows a case involving an off-brand tone. In Block 304, an off-brand or negative sentiment tone may be detected during classification of the draft model output. As shown in Block 304, a prompt such as "Do I need to pay taxes if I'm a freelancer?" may result in a draft model output exhibiting a confrontational or unprofessional tone. The verifier model may classify the token sequence as falling into a negative category due to a negative sentiment tone, even though the semantic accuracy may satisfy the target model's accuracy threshold. Responsive to the classification type being of a negative category, the context of the input prompt may be augmented with an instruction to correct the sentiment tone. Accordingly, the draft model may regenerate the portion of the token sequence to produce a modified token sequence having a corrected tone. The modified sequence may again undergo concurrent classification and accuracy evaluation. The modified sequence may be accepted only when the classification type may fall into a positive category and the semantic accuracy may satisfy the accuracy threshold, Block 306 shows a case involving missing compliance language. In Block 306, the prompt "Can I deduct office snacks?" may result in a draft model output that conveys factual content but omits mandatory compliance-related phrasing. The verifier model may classify the sequence in a negative category due to a detection of an absence of compliance-qualifying language. The target model may confirm that the semantic accuracy satisfies the threshold. Responsive to the negative category of classification, an instruction to generate compliance-qualifying language may be added to the context of the input prompt. The draft model may regenerate the portion of the sequence to produce a modified token sequence including the appropriate compliance-qualifying language. The modified token sequence may then undergo concurrent classification and accuracy checks and may be accepted when the classification type category is positive, and the semantic accuracy satisfies the accuracy threshold.

Block 308 shows a case involving semantic disagreement. In Block 308, a semantic disagreement between the draft model output and the target model evaluation may be detected. In one or more embodiments, the prompt "What forms do I need for student loan forgiveness?" may yield a draft model response containing inaccurate or unsupported content ("You need Form 1050-A"). The target model may detect a token probability mismatch or other divergence indicating that the semantic accuracy may not satisfy the accuracy threshold, even when the trust verifier may classify the tone and compliance as acceptable. Responsive to the failure to satisfy the accuracy threshold, the token sequence may be fully regenerated by the target model. This second token sequence may be assigned as the token sequence for further evaluation. In other embodiments, where both a negative classification and a semantic accuracy failure may occur, the draft model output may be discarded, and the target model may regenerate a second token sequence. The second token sequence may then be accepted after satisfying both classification and semantic accuracy criteria.

Figure 4:
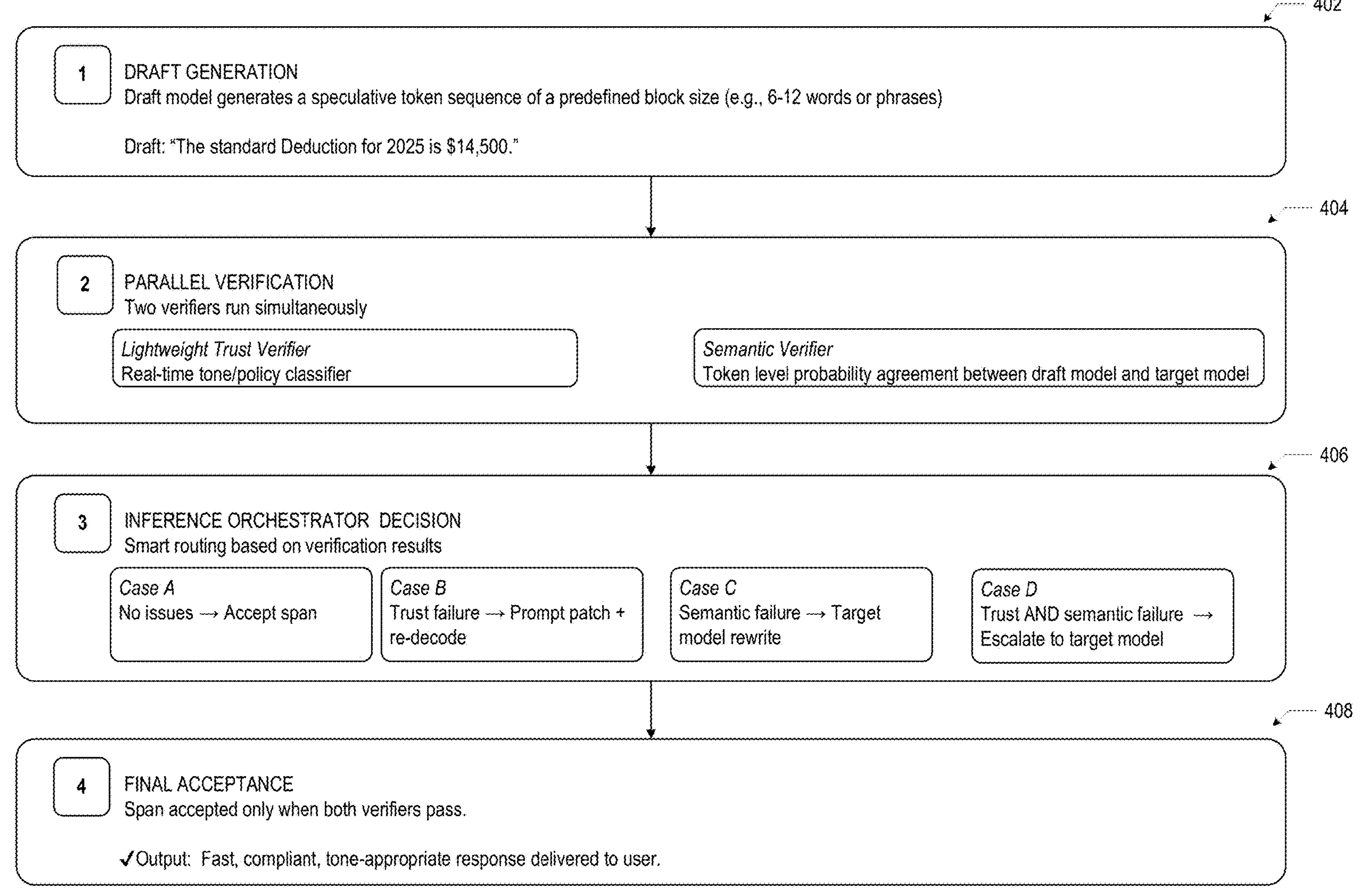

FIG. 4 shows an example implementation of a 4-step workflow for closed-loop speculative decoding, in accordance with one or more embodiments. The following example is for explanatory purposes only and is not intended to limit the scope of one or more embodiments.

In Block 402, a speculative token sequence may be generated by a draft model in response to an input prompt. In one or more embodiments, the speculative token sequence may include a sequence of tokens of a predetermined block size, such as 6-12 tokens, and the speculative token sequence may be produced by the draft model at reduced computational cost to accelerate inference. The draft model output may constitute the token sequence, and the speculative token sequence may include the token sequence. The speculative token sequence may be produced for subsequent concurrent verification, and the token sequence may be routed downstream for classification and semantic-accuracy evaluation.

In Block 404, parallel verification operations may be performed on the speculative token sequence. In one or more embodiments, two verifiers may run simultaneously, including a lightweight trust verifier that may classify a characteristic of the token sequence and a semantic verifier that may evaluate token-level probability agreement. The trust verifier may classify the token sequence into a positive or negative category based on real-time tone and/or compliance characteristics. The semantic verifier may compare a probability distribution generated by the draft model with a probability distribution generated by the target model, and a measure of difference may be used to determine whether an accuracy threshold may be satisfied. The parallel evaluation of classification type and semantic accuracy may allow acceptance only when both conditions are satisfied.

In Block 406, an inference orchestrator decision may be made based on results of the parallel verification. In one or more embodiments, the inference orchestrator may implement conditional routing that may include: Case A, in which no issues may be detected and the speculative token sequence may be accepted; Case B, in which a trust failure may be detected, a context of the input prompt may be augmented with a corrective instruction, and the draft model may regenerate at least a portion of the token sequence; Case C, in which a semantic accuracy failure may be detected and the target model may regenerate a second token sequence assigned as the token sequence; and Case D, in which both trust failure and semantic failure may occur, and the draft model output may be discarded and the target model may regenerate a second token sequence. The inference orchestrator may enforce that the token sequence may only be accepted when both the classification type may fall into a positive category and the semantic accuracy may satisfy the accuracy threshold.

In Block 408, final acceptance of the token sequence may be performed. The token sequence may be accepted only when both the trust verifier and the semantic verifier may pass their respective evaluations. Acceptance may result in the token sequence being added to an output sequence. Once accepted, the output may be transmitted as a fast, compliant, and tone-appropriate response.

By introducing dual verification of a lightweight trust classifier running in parallel with a full semantic verifier in a continuous feedback loop, the system affects fast, inference-time correction and compliance compared to single post-hoc checks. When the trust classifier detects negative sentiment tone or missing compliance-qualifying language, the system performs real-time prompt patching and re-decodes only the affected token sequence. Thus, corrective action is implemented mid-generation, obviating relying on full rewrites or retraining. Likewise, when semantic disagreement is detected, the system can escalate to a target-model rewrite or, in cases of both trust and semantic failure, discard the draft output entirely and allow the target model to regenerate the particular speculative token sequence. This closed-loop mechanism ensures that speed is preserved on the “happy path,” where the draft model’s outputs pass both trust and semantic checks, while still guaranteeing policy alignment, tone appropriateness, and factual fidelity for the accepted token sequence. By combining adaptive correction, multi-verifier gating, and continuous feedback, one or more embodiments provide runtime adaptability, introduce tone or compliance awareness, and provide a principled mechanism to enforce both speed and trustworthiness simultaneously in sensitive or regulated applications.

One or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure.

Figure 5A:
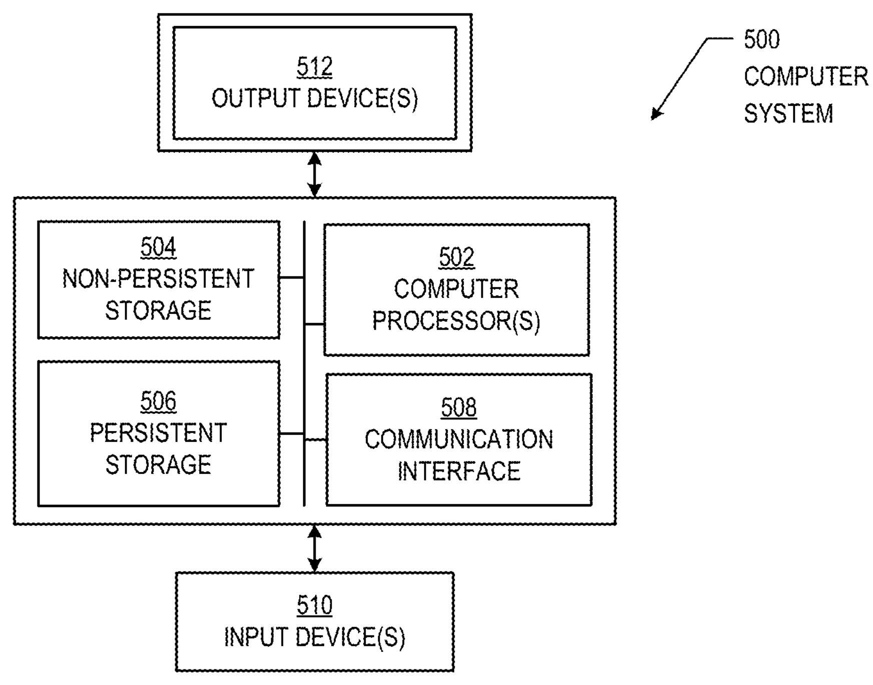
FIGS. 5A and 5B show a computing system, in accordance with one or more embodiments.

For example, as shown in FIG. 5A, the computing system (500) may include one or more computer processor(s) (502), non-persistent storage device(s) (504), persistent storage device(s) (506), a communication interface (508) (e.g., Bluetooth interface, infrared interface, network interface, optical interface, etc.), and numerous other elements and functionalities that implement the features and elements of the disclosure. The computer processor(s) (502) may be an integrated circuit for processing instructions. The computer processor(s) (502) may be one or more cores, or micro-cores, of a processor. The computer processor(s) (502) includes one or more processors. The computer processor(s) (502) may include a central processing unit (CPU), a graphics processing unit (GPU), a tensor processing unit (TPU), combinations thereof, etc.

The input device(s) (510) may include a touchscreen, keyboard, mouse, microphone, touchpad, electronic pen, or any other type of input device. The input device(s) (510) may receive inputs from a user that are responsive to data and messages presented by the output device(s) (512). The inputs may include text input, audio input, video input, etc., which may be processed and transmitted by the computing system (500) in accordance with one or more embodiments. The communication interface (508) may include an integrated circuit for connecting the computing system (500) to a network (not shown) (e.g., a local area network (LAN), a wide area network (WAN) such as the Internet, mobile network, or any other type of network) or to another device, such as another computing device, and combinations thereof.

Further, the output device(s) (512) may include a display device, a printer, external storage, or any other output device. One or more of the output device(s) (512) may be the same or different from the input device(s) (510). The input device(s) (510) and output device(s) (512) may be locally or remotely connected to the computer processor(s) (502). Many different types of computing systems exist, and the aforementioned input device(s) (510) and output device(s) (512) may take other forms. The output device(s) (512) may display data and messages that are transmitted and received by the computing system (500). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a solid-state drive (SSD), compact disk (CD), digital video disk (DVD), storage device, a diskette, a tape, flash memory, physical memory, or any other computer readable storage medium. Specifically, the software instructions may correspond to computer readable program code that, when executed by the computer processor(s) (502), is configured to perform one or more embodiments, which may include transmitting, receiving, presenting, and displaying data and messages described in the other figures of the disclosure.

Figure 5B:
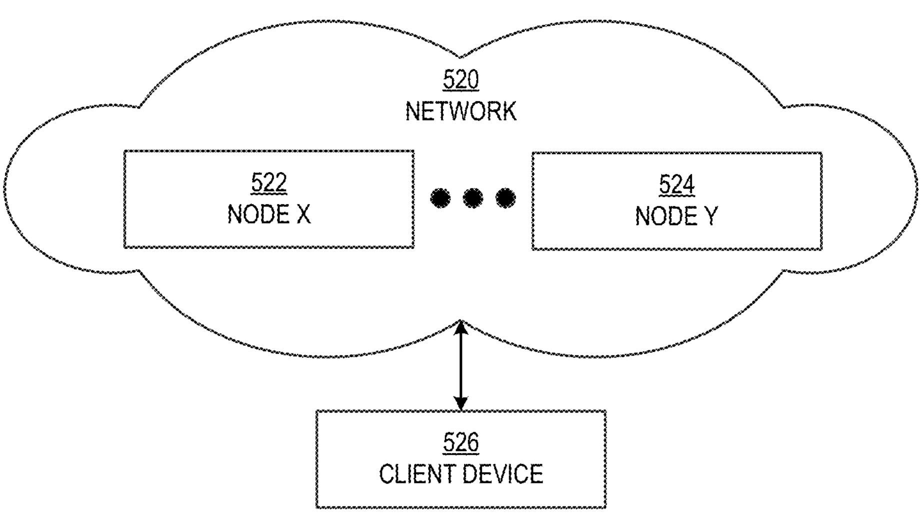

The computing system (500) in FIG. 5A may be connected to, or be a part of, a network. For example, as shown in FIG. 5B, the network (520) may include multiple nodes (e.g., node X (522) and node Y (524), as well as extant intervening nodes between node X (522) and node Y (524)). Each node may correspond to a computing system, such as the computing system shown in FIG. 5A, or a group of nodes combined may correspond to the computing system shown in FIG. 5A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (500) may be located at a remote location and connected to the other elements over a network.

The nodes (e.g., node X (522) and node Y (524)) in the network (520) may be configured to provide services for a client device (526). The services may include receiving requests and transmitting responses to the client device (526). For example, the nodes may be part of a cloud computing system. The client device (526) may be a computing system, such as the computing system shown in FIG. 5A. Further, the client device (526) may include or perform all or a portion of one or more embodiments.

The computing system of FIG. 5A may include functionality to present data (including raw data, processed data, and combinations thereof) such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown, as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be a temporary, permanent, or a semi-permanent communication channel between two entities.

The various descriptions of the figures may be combined and may include, or be included within, the features described in the other figures of the application. The various elements, systems, components, and steps shown in the figures may be omitted, repeated, combined, or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before," "after," "single," and other such terminology. Rather, ordinal numbers distinguish between the elements. By way of an example, a first element is distinct from a second element, and the first element may encompass more than one element and succeed (or precede) the second element in an ordering of elements.

Further, unless expressly stated otherwise, the conjunction "or" is an inclusive "or" and, as such, automatically includes the conjunction "and," unless expressly stated otherwise. Further, items joined by the conjunction "or" may include any combination of the items with any number of each item, unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:

generating, by a draft model, a token sequence in response to an input prompt;

performing concurrent operations comprising:

classifying, by a verifier model, a characteristic of the token sequence to obtain a classification type of the token sequence, and verifying that a semantic accuracy of the token sequence satisfies an accuracy threshold;

regenerating, to obtain a modified token sequence, at least a portion of the token sequence responsive to at least one of the classification type of the token sequence being in a negative category, and the token sequence failing to satisfy the accuracy threshold;

adding the modified token sequence to an output sequence; and transmitting the output sequence.

2. The method of claim 1, further comprising:
augmenting a context of the input prompt, with an instruction to correct a negative sentiment tone when the classification type indicates a negative sentiment,
wherein the modified token sequence has having a corrected sentiment tone.

3. The method of claim 1, further comprising:
augmenting a context of the input prompt with an instruction to generate a compliance-qualifying language responsive to the classification type indicating an absence of compliance-qualifying language,
wherein the modified token sequence has having the compliance-qualifying language.

4. The method of claim 1, wherein verifying the semantic accuracy further comprises:
comparing a first token probability distribution corresponding to a second token sequence, generated by the draft model, and a second token probability distribution corresponding to the second token sequence, generated by a target model; and
rejecting the second token sequence, responsive to a measure of difference between the first token probability distribution and the second token probability distribution failing to satisfy the accuracy threshold.

5. The method of claim 4, further comprising:
responsive to the second token sequence being rejected, generating, by the target model, a third token sequence; and
adding the third token sequence to the output sequence.

6. The method of claim 1, further comprising:
responsive to both of:
the characteristic of a second token sequence falling in the negative category, and
the semantic accuracy of the second token sequence failing to satisfy the accuracy threshold,
discarding the second token sequence generated by the draft model, and
regenerating, by a target model, a third token sequence as the second token sequence.

7. The method of claim 1, wherein the draft model generates the token sequence, and wherein the token sequence is of a predetermined block size.

8. The method of claim 1, wherein the negative category comprises a negative sentiment tone, and a detection of an absence of compliance-qualifying language.

9. The method of claim 1, wherein the concurrent operations further comprise:
evaluating the characteristic of the modified token sequence and the semantic accuracy of the modified token sequence prior to accepting the modified token sequence; and
adding the modified token sequence to the output sequence responsive to the modified token sequence satisfying the accuracy threshold and the classification type of the characteristic falling into a positive category.

10. The method of claim 9, wherein the positive category comprises a positive sentiment tone and a detection of compliance-qualifying language.

11. A system, comprising:
at least one computer processor;
a draft model, executing on the at least one computer processor;
a verifier model, executing on the at least one computer processor; and
an inference orchestrator, executing on the at least one computer processor, and configured to:
cause the draft model to generate a token sequence in response to an input prompt,
perform concurrent operations comprising:
invoking the verifier model to classify a characteristic of the token sequence to obtain a classification type of the token sequence, and
verifying that a semantic accuracy of the token sequence satisfies an accuracy threshold,
responsive to at least one of:
the classification type of the token sequence falling into a negative category, and
the token sequence failing to satisfy the accuracy threshold,
cause the draft model to regenerate at least a portion of the token sequence to obtain a modified token sequence,
add the modified token sequence to an output sequence, and
transmit the output sequence.

12. The system of claim 11, wherein the inference orchestrator is further configured to:
augment a context of the input prompt with an instruction to correct a negative sentiment tone, responsive to the classification type indicating the negative sentiment tone,
wherein the modified token sequence has a corrected sentiment tone.

13. The system of claim 11, wherein the inference orchestrator is further configured to:
augment a context of the input prompt, responsive to the classification type indicating a detection of an absence of compliance-qualifying language, with an instruction to generate the compliance-qualifying language,
wherein the modified token sequence has the compliance-qualifying language.

14. The system of claim 11, wherein the inference orchestrator is further configured to:
compare a first token probability distribution corresponding to a second token sequence, generated by the draft model, and a second token probability distribution corresponding to the second token sequence, generated by a target model; and
reject the second token sequence, responsive to a measure of difference between the first token probability distribution and the second token probability distribution failing to satisfy the accuracy threshold.

15. The system of claim 14, wherein the inference orchestrator is further configured to:
responsive to the second token sequence being rejected, invoke the target model to generate a third token sequence; and
adding the third token sequence to the output sequence.

16. The system of claim 11, wherein the inference orchestrator is further configured to:
responsive to both of:
the classification type of a second token sequence falling into the negative category, and
the semantic accuracy of the second token sequence failing to satisfy the accuracy threshold,
discard the second token sequence generated by the draft model, and
invoke a target model to generate a third token sequence as the second token sequence.

17. The system of claim 11, wherein the draft model generates the token sequence, and wherein the token sequence is of a predetermined block size.

18. The system of claim 11, wherein the negative category comprises a negative sentiment tone, and a detection of an absence of compliance-qualifying language.

19. The system of claim 11, wherein the concurrent operations further comprise:

causing the verifier model to evaluate the characteristic of the modified token sequence and the semantic accuracy of the modified token sequence prior to accepting the modified token sequence; and adding the modified token sequence to the output sequence responsive to the modified token sequence satisfying the accuracy threshold and the classification type of the characteristic falling in a positive category, wherein the positive category comprises a positive sentiment tone and a detection of compliance-qualifying language.

20. A method, comprising:

receiving, by an inference orchestrator, an input prompt from a user application;

generating, by a draft model, a first token sequence as a first partial response to the input prompt;

performing concurrent operations comprising:

classifying, by a verifier model, a characteristic of the first token sequence to obtain a classification type of the first token sequence, and verifying, by the inference orchestrator, that a semantic accuracy of the first token sequence satisfies an accuracy threshold;

responsive to the classification type indicating a negative sentiment tone, augmenting a context of the input prompt, with a first instruction to correct the negative sentiment tone;

responsive to the classification type indicating a detection of an absence of compliance-qualifying language, augmenting the context of the input prompt with a second instruction to generate the compliance-qualifying language;

regenerating, by the draft model according to at least one of the first instruction and the second instruction, a portion of the first token sequence to obtain a modified token sequence having at least one of a corrected sentiment tone and the compliance-qualifying language;

responsive to the semantic accuracy of the modified token sequence failing to satisfy the accuracy threshold, generating, by a target model, a third token sequence as a second partial response to the input prompt, adding the third token sequence to an output sequence; and transmitting the output sequence.

* * * * *